United States Patent
Parker

[15] 3,644,956
[45] Feb. 29, 1972

[54] TRANSVERSE WINDSHIELD-WIPING APPARATUS

[72] Inventor: Eric C. Parker, Kettering, Ohio
[73] Assignee: General Motors Corporation, Detroit, Mich.
[22] Filed: Aug. 27, 1970
[21] Appl. No.: 67,363

[52] U.S. Cl..........................................15/250.16, 15/250.29
[51] Int. Cl..........................................B60s 1/32, B60s 1/44
[58] Field of Search..........15/250.1, 250.16, 250.17, 250.19, 15/250.24, 250.25, 250.26, 250.27, 250.29, 250.21

[56] References Cited

UNITED STATES PATENTS

| | | | |
|---|---|---|---|
| 1,661,388 | 3/1928 | Sather | 15/250.29 X |
| 3,078,494 | 2/1963 | Price | 15/250.26 X |
| 3,505,702 | 4/1970 | Omlie et al. | 15/250.29 X |

*Primary Examiner*—Peter Feldman
*Attorney*—W. E. Finken and W. A. Schuetz

[57] ABSTRACT

In a preferred form, this disclosure relates to a windshield-wiping apparatus comprising a pair of windshield wipers and an actuating mechanism operatively connected with the wipers for reciprocating the latter transversely of the windshield while maintaining the wipers in a generally vertical disposition between first and second positions during running operation and for moving the wipers between a park position adjacent the lower edge of the windshield and its generally vertical run position when operation is initiated and terminated. The actuating mechanism includes a generally horizontally extending guide means, a trolley operatively connected with the wipers and which is supported and guided for reciprocable movement in opposite directions through a first path by the guide means during running operation, and a parking means including an auxiliary guide means extending transversely of the main guide means for guiding the trolley for movement through a second path to cause the wipers operatively connected therewith to be moved from their generally vertical run position toward their park position when operation is being terminated.

3 Claims, 10 Drawing Figures

Patented Feb. 29, 1972

INVENTOR.
Eric G. Parker
BY
W. A. Schuetz
ATTORNEY

Patented Feb. 29, 1972

INVENTOR.
Eric G. Parker
BY
W. A. Schuetz
ATTORNEY

TRANSVERSE WINDSHIELD-WIPING APPARATUS

The present invention relates to a window-wiping apparatus for wiping a window of an automotive vehicle, and in particular to a windshield-wiping apparatus having a pair of windshield wipers which are moved transversely of the windshield during running operation while being maintained in a generally vertical disposition and which are movable between their generally vertical run position and a park position adjacent the lower edge of the windshield when operation is terminated and initiated.

Heretofore, transverse wiper systems for moving a pair of wipers transversely of the windshield while maintaining them in a vertical disposition have been provided. An advantage of such a wiper system is that substantially all of the windshield can be wiped. Such wiper systems have also included a parking means or mechanisms for moving the wipers from their generally vertical run position to a generally horizontal park position adjacent the lower edge of the windshield when wiper operation is terminated. For example, U.S. Pat. No. 2,785,430 shows a separate motor and drive arrangement for pivoting the wipers between their generally vertical run position and their generally horizontal park position. U.S. Pat. Nos. 3,078,494 and 3,505,702 show transverse wiper systems in which parking mechanisms are provided for rotating the wipers from their generally vertical run position to their park position.

The present invention provides a novel transverse windshield-wiping apparatus or system for moving a pair of wipers transversely across the outer surface of the windshield between first and second positions during running operation while maintaining the windshield wipers in a generally vertical disposition and for moving the windshield wipers from their generally vertical run position toward a park position adjacent the lower edge of the windshield when wiper operation is being terminated. The wiper apparatus, in the preferred embodiment, comprises a generally horizontally extending main guide means, a trolley operatively connected with the wipers and which is supported and guided for reciprocable movement in opposite directions by the main guide means, a drive means for reciprocating the trolley in opposite directions through a first path to cause the wipers to be reciprocated between their end positions tranversely of the windshield, and a parking means for moving the wipers between their generally vertical run position and a park position, and vice versa, when operation is terminated and initiated, respectively. The parking means includes an auxiliary guide means extending transversely of the main guide means at a location between the ends of travel of the trolley and a gate at the juncture of the two guide means and which is selectively movable between a first position in which it forms part of the main guide means and a second position in which it forms part of the auxiliary guide means for guiding the trolley for movement through a second path to cause the wipers to be moved from their generally vertical run position to their parked position.

Accordingly, an important object of the present invention is to provide a new and improved windshield wiping apparatus comprising a windshield wiper and an actuating mechanism operatively connected with the wiper for reciprocating the latter transversely of the windshield while maintaining the wiper in a generally vertical disposition between first and second positions during running operation and for moving the wiper between a park position adjacent an edge of the windshield and its generally vertical run position when operation is initiated and terminated, and wherein the actuating mechanism includes a trolley operatively connected with the wiper and which is supported and guided for reciprocable movement through a first path by a main guide means during running operation of the wiper and which is guided for movement through a second path by an auxiliary guide means extending transversely of the main guide means when running operation is being terminated or initiated to cause the wipers to be moved between their parked position and their generally vertical run position, and wherein the movement of the trolley through its first and second paths is controlled by a movable gate at the juncture of the main and auxiliary guide means.

Another object of the present invention is to provide a new and improved windshield-wiping apparatus comprising a pair of windshield wipers and an actuating mechanism operatively connected with the wipers for reciprocating the latter transversely of the windshield while maintaining the wipers in a generally vertical disposition during running operation and for moving the wipers between a park position adjacent an edge of the windshield and their generally vertical run position when operation is initiated and terminated, and wherein the actuating mechanism includes a main guide means having first and second guide tracks, a trolley operatively connected with the wipers and supported and guided for reciprocable movement through a first path by the guide means, the trolley including first and second rollers disposed in the first and second guide tracks and a link having its opposite ends pivotally connected to the first and second rollers and which is operatively connected with the wipers, and a parking means including selectively operable means for guiding said trolley through its first path during running operation of the windshield-wiping apparatus and for guiding the roller in the first guide track onto an auxiliary guide track extending transversely of the first guide track while the second roller continues its movement in the second guide track when running operation is being terminated to cause the link to be rotated and hence, the wipers to be moved from their generally vertical run position towards their parked position.

A further object of the present invention is to provide a new and improved windshield-wiping apparatus as defined in the next preceding object and wherein the wipers are interconnected by a parallel linkage arrangement and supported by rollers received in a horizontally extending cam track for reciprocable movement in opposite directions, and wherein the first and second rollers of the trolley are operatively connected to the opposite ends of one of the links of the parallel linkage arrangement so that when the first roller is caused to be moved through its second path the continuing movement of the second roller in the second guide track causes the parallel linkage arrangement to be shifted to cause the wipers to be moved from their generally vertical run position toward their parked position.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
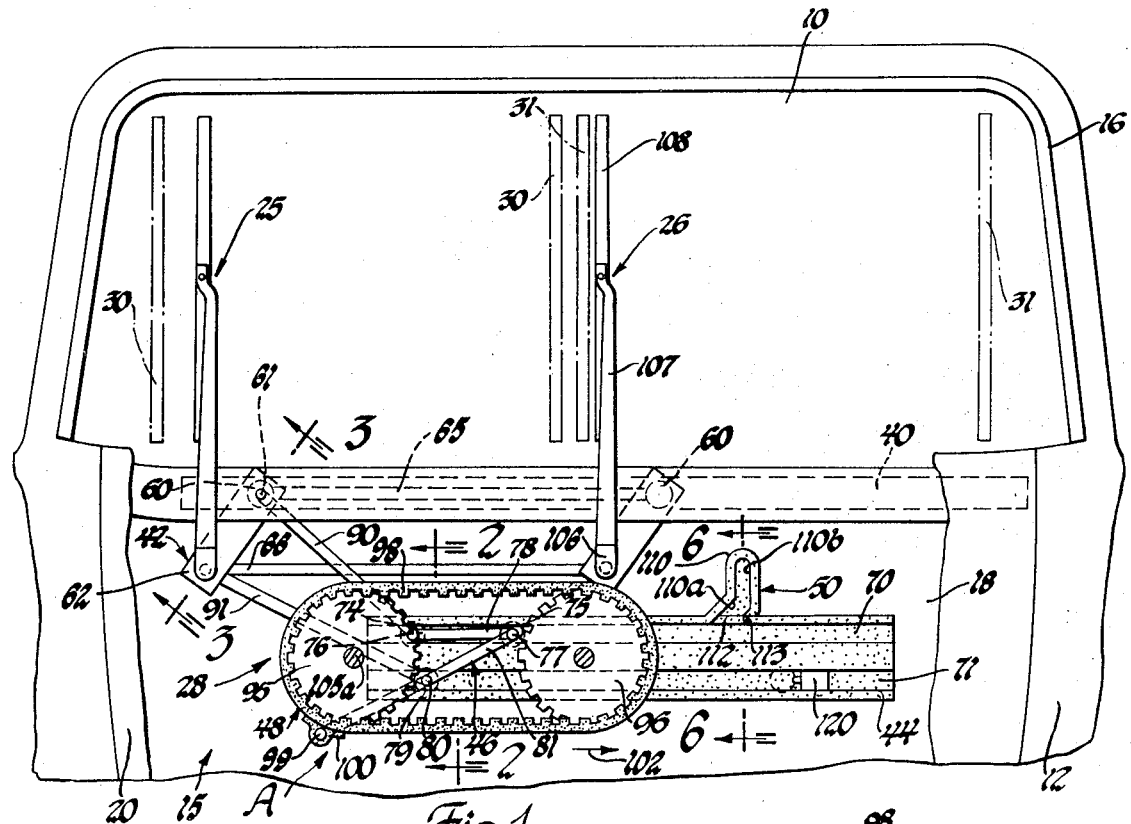
FIG. 1 is a fragmentary front elevational view of a vehicle embodying the novel windshield-wiping apparatus of the present invention.
Figure 3:
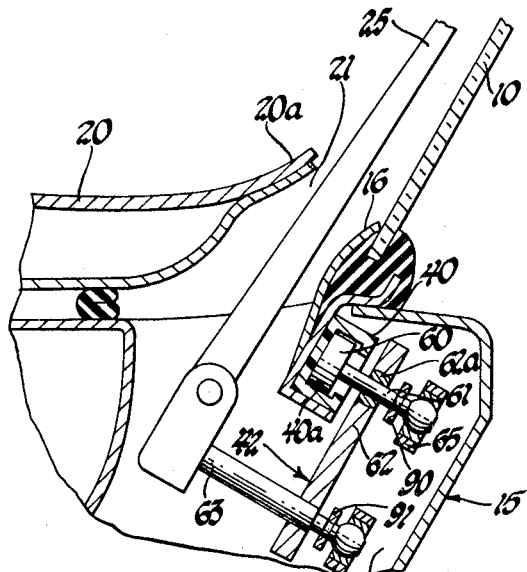
FIG. 3 is an enlarged sectional view taken approximately along line 3—3 of FIG. 1.

The present invention provides a novel window wiping apparatus for wiping a window of an automotive vehicle. Although the window-wiping apparatus of the present invention could be used for wiping various vehicle windows it is particularly useful for wiping the windshield of an automotive vehicle and thus, will be herein described as being used for the latter purpose.

As representing an illustrated embodiment of the present invention, the drawings show a windshield-wiping apparatus A for wiping a windshield 10 of an automotive vehicle 12. The windshield 10 is supported by suitable body structure 15 of the vehicle and its outer periphery is surrounded by a reveal molding 16. The body structure 15 defines a well or chamber 18 adjacent the lower edge of the windshield in which the windshield-wiping apparatus A is housed. The vehicle 12 also includes a forwardly extending hood 20 whose rearward edge 20a is spaced forwardly of the windshield 10 to define a slot 21 extending transversely of the vehicle 12. The slot 21 is communication with the well 18.

The windshield-wiping apparatus A comprises, in general, a pair of windshield wipers 25 and 26 and an actuating mechanism 28 operatively connected with the windshield wipers 25 and 26 for reciprocating the latter transversely of the window 10 while the wipers 25 and 26 remain in a generally vertical disposition between first and second positions 30 and 31, respectively, during running operation and for moving the wipers from their generally vertical run position to a generally horizontal park position P (see FIG. 10) adjacent the lower edge of the windshield 10, and vice versa, when operation is being terminated and initiated. The actuating mechanism 28 broadly comprises a wiper guide track 40, a wiper support means 42 supported and guided for reciprocable movement by the wiper guide track 40, a main guide means or track 44, a trolley 46 operatively connected with the wiper support means 42 and which is supported and guided for reciprocable movement by the main guide track 44 through a first path of movement to cause the wipers 25 and 26 to be reciprocated between their first and second positions 30 and 31 during running operation, a drive means 48 operatively connected with the trolley 46 for reciprocating the same and a parking means or mechanism 50 which is selectively operable to guide the movement of the trolley 46 through its first path of movement during running operation and which is operable to guide the movement of the trolley 46 through a second path of movement when running operation is being terminated to cause the wipers 25 and 26 to be moved from their generally vertical run position toward their park position P.

Figure 2:
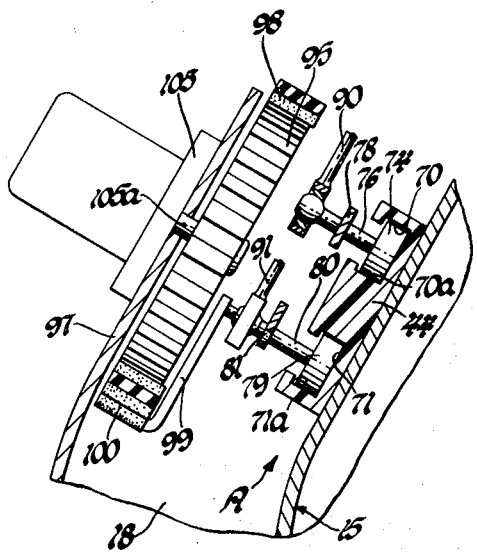
FIG. 2 is an enlarged sectional view taken approximately along line 2—2 of FIG. 1.

As best shown in FIGS. 1 and 2, the wiper guide track 40 is suitably secured to the body structure 15 of the vehicle and comprises an elongated channel which is C-shaped as viewed in cross section. The guide track 40 is horizontally disposed adjacent the lower edge of the windshield 10.

The wiper support means 42 is supported and guided for reciprocable movement in opposite directions by the guide track 40. The wiper support means 42 comprises a pair of rollers 60 which are received within the guide track 40 and which roll on the bottom inner surface 40a thereof. The rollers 60 are each rotatably journaled to one end of a shaft 61. The other end of the shafts 61 is connected to one end of a pivot plate or arm 62. As best shown in FIG. 2, the pivot plate 62 is swivelly connected via a bearing 62a to the shaft 61 for both pivotal movement about the axis of the shaft and for limited movement toward and from the guide track 40. Fixed to the other end of the pivot plates 62 is a stub shaft 63 to which the windshield wipers are securely attached. The shafts 61 at their ends remote from the roller 60 are pivotally connected via a ball-and-socket joint to a cross link 65 and the pivot plates 62 adjacent their lower ends are pivotally connected via ball-and-socket joints to the opposite ends of a cross link 66. The pivot plates 62 and the cross-links 65 and 66 comprise a parallel linkage arrangement.

The wiper support means 42 is adapted to be reciprocated back and forth and with its movement being guided by the guide track 40. The wiper support means is reciprocated by the trolley 46. The trolley 46 is operatively connected with the wiper support means 42 and is guidably supported for reciprocable movement by the main guide means 44. The main guide means 44 is suitably secured to the vehicle support structure 15 and extends parallel to the guide track 40. The main guide means 44 has a pair of horizontally extending guide tracks 70 and 71 formed therein.

The trolley 46 comprises first and second spaced rollers 74 and 75 disposed within the first guide track 70 of the main guide means 44. The rollers 74 and 75 are rotatably journaled on stub shafts 76 and 77, respectively. The stub shafts 76 and 77 of the first and second rollers 74 and 75 are pivotally connected to the opposite ends of a link 78. The trolley 46 further includes a third or drive roller 79 which is received within the second guide track 71. The third roller 79 is rotatably journaled on a stub shaft 80 and is normally vertically disposed beneath the first roller. The second and third rollers 75 and 79 are pivotally connected to the opposite ends of a link 81. The rollers 74, 75 and 79 when reciprocated within the guide tracks 70 and 71 roll on the bottom surfaces 70a and 71a, respectively, thereof. The trolley 46 is also operatively connected with the pivot plate 62 for carrying the wiper 25. To this end, a link 90 has one end swivelly connected to the shaft 61 and its other end pivotally connected to stub shaft 76 of the roller 74 and a link 91 has one end pivotally connected to the stub shaft 80 of the roller 79 and its other end swivelly connected lower end of the pivot plate 62.

The trolley 46 is adapted to be reciprocated from a position adjacent the left end of the guide means 44, as viewed in FIG. 1, to a position adjacent the right end of the guide means 44 by the drive means 48. The drive means 48 comprises a pair of spaced rotatable sprocket wheels 95 and 96 rotatably supported by a wall 97 of the body structure 15 of the vehicle 12. An endless toothed belt 98 is trained around the sprocket wheels 95 and 96. The belt 98 is connected to the drive roller 79 by an L-shaped link 99. The link 99 has one leg thereof pivotally secured to a bracket 100 carried by the belt on its outer side and its other end pivotally connected to the shaft 80 of the drive roller 79.

The endless belt 98 is adapted to be continuously moved in the direction of the arrow 102 by an electric motor and gear reduction unit 105. The motor and gear reduction unit 105 could be of any suitable or conventional construction and is secured to the support wall 97. The electric motor and gear reduction unit 105 has its output shaft 105a drivingly connected to the sprocket wheel 95. When the endless belt 98 is moved in the direction of the arrow 102, the link 99 causes the trolley 46 to be linearly moved along the guide tracks 70 and 71. Reciprocation of the trolley 46 in turn causes the wiper support means 42 and the windshield wipers 25 and 26 to be reciprocated along the guide track 40. The trolley 46 and the wipers 25 and 26 will be reciprocated toward the right, as viewed in FIG. 1, until the bracket 100 for pivotally supporting the link 99 reaches its rightmost position and then the trolley and the wipers will be reciprocated toward the left. The wipers 25 and 26 during running operation will be maintained in their generally vertical position shown in FIG. 1 as a result of the parallel linkage arrangement between the wipers 25 and 26 and as a result of the links 90, 91. During running operation, the trolley 46 is reciprocated back and forth through a linear path, which in turn causes the wipers 25 and 26, whose movement is guided by the guide track 40 to be reciprocated back and forth linearly or transversely of the windshield 10.

The windshield wipers 25 and 26 can be of any suitable or conventional construction and each is here shown as comprising a wiper arm having spring hinged connected inner and outer wiper arm sections 106 and 107 for carrying and biasing a wiper blade assembly 108 into engagement with the windshield 10.

Figure 5:
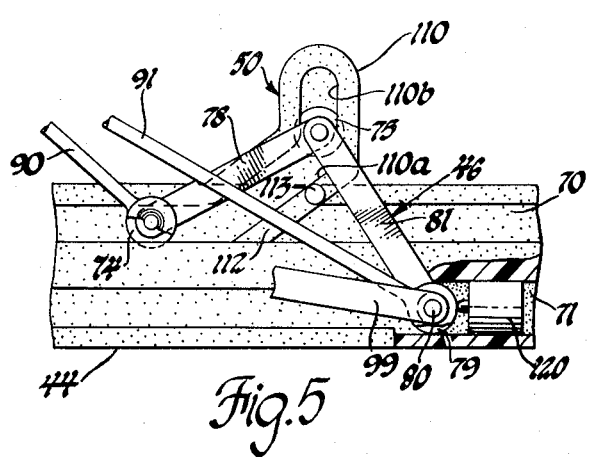
FIG. 5 is a view similar to FIG. 4 but showing different parts thereof in different positions.
Figure 4:
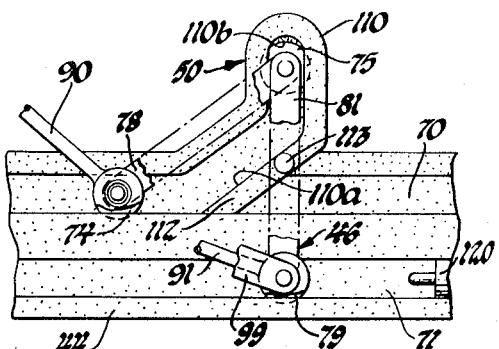
FIG. 4 is an enlarged fragmentary view of part of the windshield-wiping apparatus shown in FIG. 1.

As alluded to hereinbefore, the wipers 25 and 26 are adapted to be moved from their generally vertical run position to their park position when wiper operation is being terminated. To this end, the parking means 50 is provided. As best shown in FIGS. 4 and 5, the parking means 50 comprises an auxiliary guide track 110 which extends transversely of the guide track 70 and which is located intermediate the ends of travel of the trolley 46. The auxiliary guide track 110 has a first portion 110a which is disposed at an acute angle with respect to the guide track 70 and a second portion 110b which extends generally normal to the longitudinal axis of the guide track 70. The parking means 50 also includes a gate or member 112 which is pivotally connected by a pivot pin means 113 at its rearward end to the upper side of the guide track 70 at the juncture of the guide track 70 and the auxiliary guide track 110.

The gate 112 is pivotally movable between first and second positions. When the gate 112 is in its first position, as shown in FIG. 1, it forms part of the guide track 70 and it aids in guiding the trolley 46 for movement through its first path. When the gate 112 is in its second position, as shown in FIG. 4, it forms part of the auxiliary guide track 110 and serves to guide the movement of the trolley 46 through a second path which effects movement of the wipers 25 and 26 from their generally vertical run position to their parked position and in a manner to be described hereinbelow.

Figure 6:
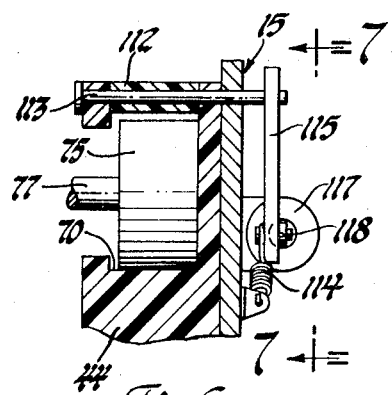
FIG. 6 is an enlarged sectional view taken approximately along line 6—6 of FIG. 1.

The gate 112 is normally biased by a spring 114 toward its second position, as shown in FIG. 6. The spring 114 has one end connected to the stationary support structure 15 of the vehicle 12 and its other end connected to one end of a crank arm 115. The other end of the crank arm 115 is fixed to the pivot pin 113. The gate 112 is adapted to be moved from its second position, as shown in FIG. 6, toward its first position, as shown in FIG. 1, by a solenoid 117 when running operation of the wipers is initiated. The solenoid 117 has a movable core 118 which is connected to the crank arm 115 at its end to which the spring 114 is connected. The solenoid 117 is energized during running operation of the wipers and holds the gate 112 in its first position in opposition to the biasing force of the spring 114.

The solenoid 117 is adapted to be connected in an electric circuit with a manually controllable on-off control switch (not shown) so that when operation is initiated by turning on the control switch the solenoid is energized. When the control switch is shutoff the solenoid is deenergized. The control switch is also connected via a parallel circuit with the electric motor 105 so that it is energized when the control switch is turned on. The control circuitry also includes a park switch 120 which is connected in circuit with the electric motor and in parallel with the control switch to maintain the wipers in operation upon the control switch being turned off until they reach their park position. The park switch 120 is located in the guide track 71, as shown in FIG. 1.

When running operation of the wipers 25 and 26 is no longer desired, the operator will turn off the control switch (not shown), which in turn deenergizes the solenoid 117 and allows the spring 114 to move the gate member 112 from its first position, as shown in FIG. 1, to its second position, as shown in FIG. 6, in which the gate forms part of the auxiliary guide track 110. The wiper apparatus, however, remains energized due to the provision of the park switch which is connected in parallel with the control switch and which is closed during running operation. As the trolley 46 moves toward the right, as viewed in FIG. 1, and the wipers 25 and 26 approach their second position 31, the roller 75 of the trolley 46 will engage the gate member 112. This causes the roller 75 to be guided onto the auxiliary guide track 110, as shown in FIG. 4. The rollers 74 and 79, however, remain in their guide tracks 70 and 71. As the trolley 46 continues to move the roller 75 will move first onto the portion 110a and then the portion 110b of the auxiliary guide track 110 while the roller 79 continues to move in its guide track 71, as shown in FIG. 5. This movement continues until the roller 79 engages the park switch 120 to open the same and deenergize the motor 95 to stop wiper operation.

Figure 8:
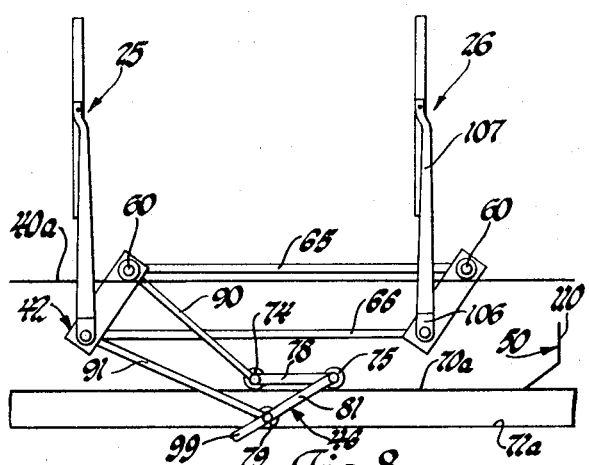
FIGS. 8–10 are schematic views showing different operational positions of the windshield-wiping apparatus shown in FIG. 1.
Figure 9:
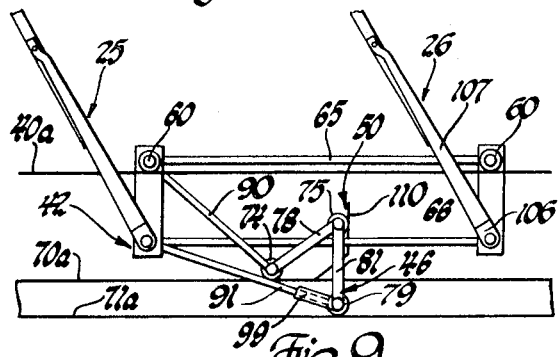
Figure 7:
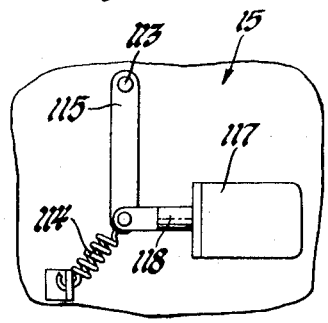
FIG. 7 is a fragmentary side elevational view looking in the direction of the arrow 7—7 of FIG. 6.
Figure 10:
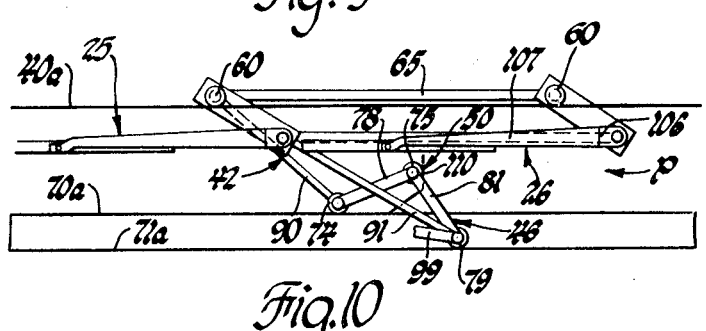

Referring to FIGS. 8 through 10, it can be seen that as the trolley 46 is guided onto the auxiliary guide track 110 the link 81 interconnecting the rollers 75 and 79 is caused to rotate in a counterclockwise direction about the axis of roller 79. As the link 81 rotates in the counterclockwise direction it pulls on link 91 to cause the pivot plate 62 to be rotated in a counterclockwise direction. Rotation of the pivot plate 62 in the counterclockwise direction in turn causes the wiper 25 and the wiper 26 due to the parallel linkage arrangement to be moved in a counterclockwise direction from a generally vertical position toward their parked position P. When the roller 75 reaches its end position in the auxiliary guide track 110 the drive roller 79 will be positioned to the right thereof and the extent of the rotative movement of the link 81 in a counter clockwise direction is approximately 90°. When the drive roller 79 engages the park switch 120 operation is stopped and the wipers 25 and 26 will be in their parked position P. The wipers 25 and 26 are disposed within the slot 21 so as to be concealed from view when in their park position. In this position the roller 74 is in engagement with the gate member 112 and the roller 75 is located in the second portion 110b of the auxiliary guide track and roller 79 is located to the right of the roller 75. Also when the wipers are in their park position P the link 99 is disposed at its rightmost end travel position.

When wiper operation is initiated, the reverse movement of the various parts takes place. When the wiper operation is initiated by turning on the control switch (not shown) the solenoid 117 is energized. However the gate 112 cannot initially move from its second position, as shown in FIG. 6, toward its first position, as shown in FIG. 1, due to its engagement with the roller 74. Upon energization of the wiper motor the endless belt 98 will cause the link 99 to pull the drive roller 79 of the trolley 46 toward the left. As the trolley 46 moves toward the left it moves through its second path to cause the link 81 to move in a clockwise direction and hence the wipers from their park position P toward their generally vertical run position. When the roller 75 has cleared the gate 112, the spring 114 will cause the gate to be moved toward its first position, as shown in FIG. 1, and hence, thereafter the trolley 46 will be guided for movement through its first path during running operation of the wiper apparatus A.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention

What is claimed is:

1. A window-wiping apparatus for wiping a window of an automotive vehicle comprising: a window wiper; and an actuating mechanism operatively connected with the wiper for reciprocating the latter transversely of the window while maintaining the wiper in a generally vertical disposition between first and second positions during running operation and for moving the wiper between a generally horizontal park position and a generally vertical position when operation is initiated and terminated; said actuating mechanism including a generally horizontally extending main guide means, a trolley supported and guided for movement in opposite directions through a first generally horizontal path by said guide means, said wiper being operatively connected with said trolley and having a generally vertical disposition when said trolley is moved through said first path, a drive means operatively connected with said trolley for reciprocating the latter through said first path and thereby said wiper transversely of said window between its first and second positions, and a parking means for pivoting said wiper between its parked position and its generally vertical position when operation is initiated and terminated, said parking means comprising a stationary auxiliary guide means extending transversely of said main guide means for guiding said trolley for movement through a second path to cause said wiper to be moved from its generally vertical position toward its parked position, and a selectively operable member at the juncture of the main and auxiliary guide means and which is movable between a first position during running operation in which it aids in guiding the trolley through said first path and a second position when running operation is being terminated in which it guides and effects movement of said trolley through its second path.

2. A window-wiping apparatus for wiping a window of an automotive vehicle comprising: a window wiper; and an actuating mechanism operatively connected with the wiper for reciprocating the latter transversely of the window while maintaining the wiper in a generally vertical disposition between first and second positions during running operation and for moving the wiper between a generally horizontal part position and a generally vertical position when operation is initiated and terminated; said actuating mechanism including first and second generally horizontally extending guide tracks, a trolley supported and guided for movement in opposite directions through a first path by said guide tracks, said trolley including first and second rollers disposed in said first and second guide tracks, respectively, and a link having its opposite ends pivotally connected to said first and second rollers, said wiper being operatively connected with said link, a drive means operatively connected with said second roller for reciprocating said trolley through said first path and thereby said wiper transversely of said window between its first and second positions, and a parking means for moving said wiper between its parked position and its generally vertical position when operation of the wiper apparatus is initiated and terminated, said parking means comprising an auxiliary guide track extending transversely of said first guide track and at a location intermediate the ends of travel of said trolley when moved through its first path, said auxiliary guide track guiding said first roller for movement through a second path transverse to said first path while said second roller continues to move in said second track to cause said link to rotate about the axis of said second roller and said wiper to move between its generally vertical run position and its parked position; and means selectively operable to effect movement of said first roller through either its first or second paths, said means including a pivotal member movable between a first position in which it forms part of said first guide track to guide the first roller through its first path and a second position in which it forms part of said auxiliary guide track to guide said first roller through its second path.

3. In combination, an automotive vehicle having a windshield supported by body structure of the vehicle and a windshield-wiping apparatus for wiping the windshield of the vehicle, said windshield-wiping apparatus comprising: a pair of spaced windshield wipers, an actuating mechanism operatively connected with said windshield wipers for reciprocating the latter transversely of the windshield while maintaining said wipers in a generally vertical disposition between first and second positions during running operation and for moving the wipers between their generally vertical position and a park position adjacent an edge of the windshield when operation of the apparatus is initiated and terminated; said actuating mechanism comprising a first guide track, first and second spaced support rollers received in said guide track and guidably supported for movement in opposite directions therein, first and second support arms having one end pivotally connected to said first and second rollers, respectively and their other ends fixedly connected to one of said wipers, second and third generally horizontally extending guide tracks, a trolley supported and guided for movement in opposite directions through a first path by said guide tracks, said trolley comprising a drive roller disposed in said third guide track, a pair of spaced follower rollers disposed in said second guide track, a first link having its opposite ends pivotally connected to one of said follower rollers and to said drive roller, a second link having its opposite ends pivotally connected to said follower rollers, a third link having its opposite ends pivotally connected with said first support arm and the other follower roller, a fourth link having its opposite ends pivotally connected with said drive roller and said first support arm at a location remote from said first support roller, a fifth link having its opposite ends connected with said first and second support rollers whereby when said drive roller of said trolley is reciprocated through said first path said support rollers are reciprocated in the first guide track to cause said wipers to reciprocate transversely of the windshield while being maintained in a generally vertical disposition, a drive means operatively connected with said drive roller to reciprocate the trolley through said first path, a parking means for moving said wipers between their generally vertical position and their park positions when operation of the windshield-wiping apparatus is initiated and terminated, said parking means comprising an auxiliary guide track extending transversely of said second guide track and at a location intermediate the ends of travel of said trolley when moved through its first path, means including a pivotal member movable between a first position in which it forms part of said second guide track to effect movement of said follower rollers through their first path and a second position in which it forms part of said auxiliary guide track to guide at least one of said follower rollers onto said auxiliary guide track, said auxiliary guide track guiding said one follower roller for movement through a second path while said other follower roller and said drive roller of said trolley continue to move in said second and third guide tracks whereby said support arms are caused to be rotated to move the wipers from their generally vertical position toward their parked position when running operation is terminated.

\* \* \* \* \*